United States Patent [19]

Bromley

[11] 3,881,083

[45] Apr. 29, 1975

[54] WELDING APPARATUS

[75] Inventor: Thomas D. Bromley, Anchorage, Ky.

[73] Assignee: Dover Corporation, Louisville, Ky.

[22] Filed: Oct. 23, 1973

[21] Appl. No.: 408,567

[52] U.S. Cl. .................................. 219/84; 219/119
[51] Int. Cl. ............................................ B23k 11/06
[58] Field of Search ................ 219/81, 84, 119, 120

[56] References Cited
UNITED STATES PATENTS

| | | | |
|---|---|---|---|
| 2,402,952 | 7/1946 | Diamond et al. | 219/81 |
| 2,918,564 | 12/1959 | Russell | 219/84 |
| 2,942,094 | 6/1960 | Broad | 219/81 |

Primary Examiner—J. V. Truhe
Assistant Examiner—N. D. Herkamp
Attorney, Agent, or Firm—Emory L. Groff, Jr.

[57] ABSTRACT

A resistance welding apparatus comprises a pair of contra-rotating electrode wheels and includes a non-conductive disc affixed to one face of one of the wheels with the disc having a diameter less than that of the wheel and serving as a rigid abutment against which a surface of a traveling work piece is urged to maintain proper alignment of the weld seam as formed by the electrode wheels.

6 Claims, 5 Drawing Figures

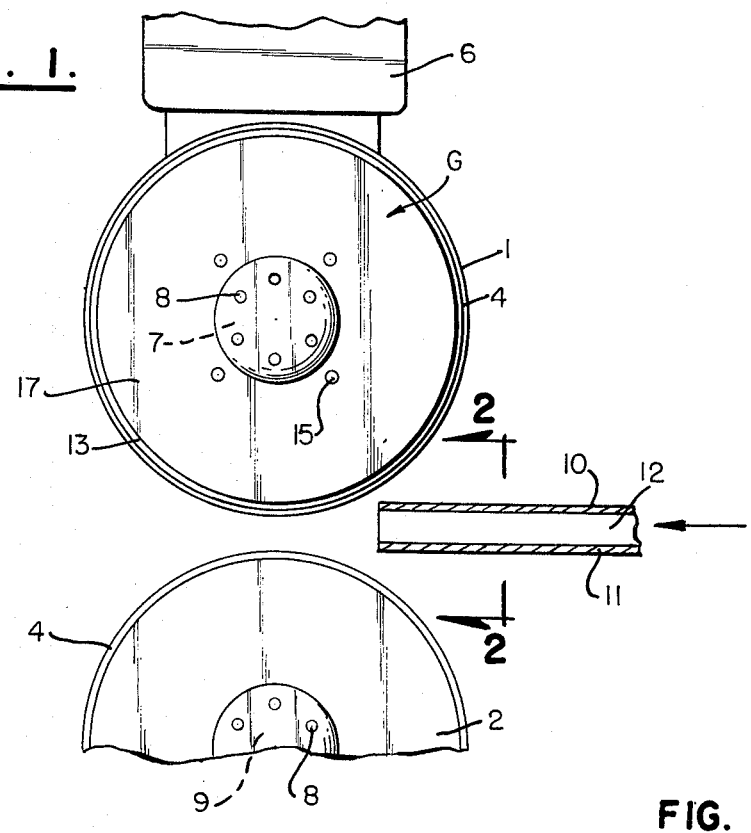
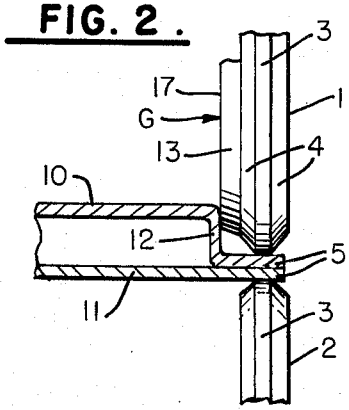
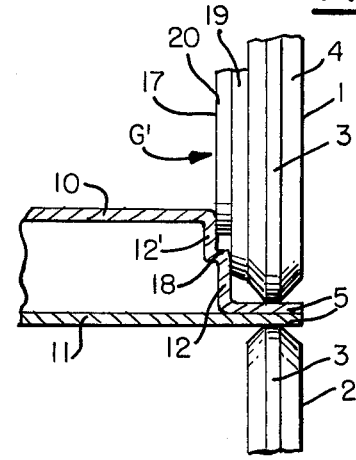
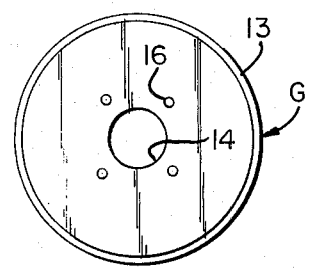
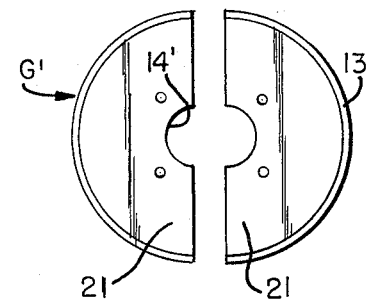

WELDING APPARATUS

This invention relates generally to a welding apparatus, and more particularly, to a resistance welding apparatus including means for assisting in the guiding of workpieces therethrough to insure a uniform or properly aligned weld seam.

The present invention relates to resistance welding devices of the type incorporating a pair of rotary welding wheels or electrode wheels, at least one of which is driven, and between which at least a pair of overlying or sandwiched sheets of metal are passed in order to produce a continuous or intermittent seam weld on the workpieces. In the past, considerable difficulty has been experienced in providing ready means for maintaining a properly positioned or spaced seam weld as the workpieces are drawn through the contra-rotating electrode wheels. Often the eye and hands of the operator are the only means relied upon to maintain a straight seam weld as the operator guides the workpieces and attempts to maintain an accurate alignment thereof with respect to the weld path offered by the juxtaposed peripheral surfaces of the electrode wheels. In many instances fixed guide or stop members are used for assisting in maintaining some degree of proper alignment of the workpieces as they travel between the electrode wheels.

By the present invention, an improved arrangement is provided for insuring an accurate straight continuous weld seam by means of a relatively simple and inexpensive attachement forming a part of one of the electrode wheel assemblies. This attachment comprises a guide disc removably attached to a face of the electrode wheel and having a diameter less than the diameter of the welding wheel whereby the outer face of the guide disc, which will be understood to be of non-conductive material, serves as a fence or abutment surface against which a portion of the workpiece is constantly urged by the operator to thereby insure a positively aligned weld seam.

Accordingly, one of the primary objects of the present invention is to provide an improved welding apparatus including guide means carried by one of the electrode wheels and against which a traveling workpiece is adapted to abut during passage through the welding apparatus.

Another object of the present invention is to provide an improved welding apparatus including a welding wheel having a guide disc of non-conductive material attached to its outer face and having a diameter less than that of the welding wheel.

Still another object of the present invention is to provide a guide disc for a welding apparatus including a pair of contra-rotating electrode wheels and wherein the guide disc comprises a pair of split half-sections removably attached to one face of one of the electrode wheels.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

FIG. 1 is a fragmentary side elevation of a welding apparatus according to the present invention;

FIG. 2 is an end elevation taken along the line 2–2 of FIG. 1;

FIG. 3 is a view similar to FIG. 2 and illustrates a modification thereof;

FIG. 4 is a side elevation of the guide disc of the present invention and

FIG. 5 is a side elevation of another embodiment of the guide disc of the present invention.

Similar reference characters designate corresponding parts throughout the several figures of the drawing.

Referring now to the drawing, particularly FIG. 1, the present invention will be seen to relate to a resistance welding apparatus including a pair of contrarotating welding wheels, namely, an upper electrode wheel 1 and a lower electrode wheel 2. The specific structure included for supporting, driving, adjusting, cooling and supplying electric current to the two electrode wheels is not shown since any well known structure may be utilized in the practice of the present invention. Likewise, the exact configuration of each of the electrode wheels itself is immaterial. As shown in the present drawing, each electrode wheel includes an outer peripheral surface or welding edge 3 bounded on either side by the bevels 4–4 and between which the layered or sandwiched edges 5–5 of the sheet metal workpieces are positioned in order to produce a seam weld therethrough.

In the example shown in FIG. 1, the upper electrode wheel 1 is carried by a movable head 6 containing the horizontally disposed shaft or hub 7 to which is attached the upper electrode wheel 1 by fastener means such as by bolts 8. In a similar manner, the lower electrode wheel 2 is attached to a second horizontally disposed shaft 9.

Considering that it is desired to provide a seam weld for the sandwiched edges 5 of the upper workpiece 10 and lower workpiece 11, as shown in FIG. 2, it will be appreciated that normally it will be quite difficult to insure a constant spacing of the weld seam as formed by the opposed welding edges 3–3 of the two electrode wheels during passage of the flanges or edges 5–5 therebetween. With the provision of the raised shoulder 12 of the upper workpiece 10 experience has shown that the upper welding wheel 1 has a tendency to ride toward and over the shoulder 12 onto the raised portion of the upper workpiece 10.

To preclude the above action and to insure a straight properly spaced weld seam when operating upon workpieces as described, the guide disc G of the present invention is provided. The guide disc G comprises a planar member constructed of non-conductive rigid material and is formed with a circular peripheral edge 13 having a diameter substantially less than that of the welding wheel peripheral edge 3 for reasons which will become obvious. The peripheral edge 13 may in turn be beveled, as shown in FIG. 2. The disc G is formed with a central cut-out or annular aperture 14 shown most clearly in FIG. 4 which is adapted to surround the hub or shaft 7 and is secured in overlying relationship to the exposed face of the electrode wheel by means of suitable bolts or fasterners 15 passing through the mounting holes 16 formed in the disc. By this arrangement, it will be seen that the guide disc G may be removed from the upper electrode assembly by itself upon the removal of the fasteners 15, or, on the other hand, the upper electrode wheel 1 together with the guide disc G may be removed as a unit by the removal of the fasteners 8.

The operation of the present invention should now be readily understood, particularly when viewing FIG. 2 of the drawing, wherein it will be seen that as the sandwiched workpieces 10 and 11 are pulled through the contra-rotating welding wheels 1 and 2, the outer face 17 of the guide disc G will be maintained in constant abutment with the outer surface of the shoulder 12 of the upper workpiece 10.

In other words, it is only necessary for the operator regulating the passage of the workpieces through the apparatus to insure that the shoulder 12 is in constant engagement with the outer face 17 of the disc guide in order to provide a straight continuous or intermittent weld seam to the sandwiched edges 5–5 of the workpiece.

FIG. 3 of the drawing illustrates a modification of the guide disc G which may be incorporated in a resistance welding apparatus when the workpieces passing therethrough are of an alternate construction, namely, including the step 18 in combination with the shoulder 12. This guide disc G' will be seen to include a multi-diameter construction providing a larger diameter section 19 mounted directly upon the outer face of the electrode wheel and combined with an outermost lesser diameter section 20. The disc G' may be molded to provide a unitary member having the two diameter sections or may comprise two separate discs of differing diameters which are stacked upon one another and attached to the welding wheel in a manner similar to that illustrated in connection with the first-described embodiment. In either instance, it will be seen that with this modification the step 18 and two shoulders 12 and 12' are both utilized in combination with rigid non-conductive discs to maintain proper alignment of the workpieces as they pass between the welding wheels.

The modification illustrated in FIG. 5 may be practiced in connection with either the disc G or disc G' and involves the formation of a pair of split half sections 21–21 each of which contains a semicircular annular aperature 14'. With this arrangement should only a portion of the disc become damaged, then it will be necessary to replace only half of the disc, thus reducing the expenditure involved. Additionally, when operating upon workpieces configured other than as shown in FIGS. 2 and 3, such as for example wherein the weld seam is intended to be made between two raised portions of a workpiece, it may be desirable to have the guide disc mounted upon the inside face of one of the electrode wheels. In such an instance, the provision of the split half sections is a decided advantage inasmuch as the disc may then be attached to the back or reverse side of a welding wheel without having to remove the wheel form its shaft or hub.

I claim:

1. A welding apparatus including, a rotatable shaft, a rotary electrode wheel rigidly affixed to said shaft to preclude axial and radial displacement relative thereto, said wheel having a peripheral welding surface adapted to be pressure urged against a workpiece provided with a raised portion disposed laterally spaced from that surface of the workpiece intended to be welded by said peripheral surface, a rigid guide disc affixed in a concentric stationary juxtaposed manner to one side of said wheel and provided with an outer face, said disc of non-conductive material and having a circular peripheral surface of a diameter less than that of said wheel peripheral surface, said rigid disc outer face and peripheral surface disposed axially and radially substantially clear of said wheel peripheral surface, whereby, as said electrode wheel peripheral surface engages and travels over said workpiece said disc outer face is urged against said workpiece raised portion to maintain said wheel peripheral surface a constant distance therefrom.

2. A welding apparatus according to claim 1 wherein, said disc is planar.

3. A welding apparatus according to claim 1 wherein, said disc peripheral surface is a bevel.

4. A welding apparatus according to claim 1 wherein, said electrode wheel is attached to the end of said shaft by means of removable fasteners, said disc including a central annular aperture and fastener means securing said disc to said wheel.

5. A welding apparatus according to claim 1 wherein, said disc includes a pair of split half-sections each provided with a semi-circular peripheral edge.

6. A welding apparatus according to claim 1 wherein, said disc comprises a lesser diameter section overlying a greater diameter section adapted to engage a workpiece provided with a pair of offset raised portions.

* * * * *